United States Patent [19]
Murphy

[11] Patent Number: 4,902,906
[45] Date of Patent: Feb. 20, 1990

[54] SECURITY LIGHTING SYSTEM

[76] Inventor: Gordon J. Murphy, 638 Garden Ct., Glenview, Ill. 60025

[21] Appl. No.: 204,422

[22] Filed: Jun. 9, 1988

[51] Int. Cl.$^4$ ................................................ H02J 7/00
[52] U.S. Cl. ................................... 307/117; 307/141; 307/141.4; 315/159; 315/360
[58] Field of Search ........... 307/117, 132, 141, 141.14, 307/141.8; 315/149–159; 340/555, 556, 557, 527, 528, 529, 583

[56] References Cited

U.S. PATENT DOCUMENTS

| | | | |
|---|---|---|---|
| 4,002,925 | 1/1977 | Monahan | 315/360 X |
| 4,229,664 | 10/1980 | Blake et al. | 307/117 |
| 4,354,120 | 10/1982 | Schornack | 315/360 X |
| 4,362,970 | 12/1982 | Grady | 307/141.4 X |
| 4,451,763 | 5/1984 | Sodini | 315/159 |
| 4,568,868 | 2/1986 | Schlepp et al. | 307/117 X |
| 4,575,659 | 3/1986 | Pezzolo et al. | 315/159 |
| 4,587,417 | 5/1986 | Duve et al. | 315/360 X |
| 4,766,331 | 8/1988 | Flegel et al. | 307/141 |

*Primary Examiner*—William M. Shoop, Jr.
*Assistant Examiner*—Paul Ip
*Attorney, Agent, or Firm*—Davis Chin

[57] ABSTRACT

A security lighting system for automatically connecting and disconnecting a plug connected to electric power to an electric outlet connectable to an electric appliance includes a photodetector circuit, a microcomputer, and a switching device. The photodetector circuit senses the level of ambient light and generates a light signal. The microcomputer is controlled by a stored program for sampling the light signal from the photodetector circuit only between a first predetermined time of day and a second predetermined time of day. The switching device is responsive to the light signal for selectively connecting the plug to the electric outlet when the ambient light level is below a certain level between the first and second predetermined times of day and disconnecting the plug from the electric outlet when the ambient light level is above the certain level between the first and second predetermined times of day, as well as throughout the remainder of the day regardless of the ambient light level.

9 Claims, 3 Drawing Sheets

SECURITY LIGHTING SYSTEM

CROSS REFERENCE TO RELATED APPLICATION

This application is related to Ser. No. 156,832 filed on Feb. 17, 1988, entitled "Computer Timer" and filed in the names of the inventors Gordon J. Murphy and Martin A. Plonus. That application, Ser. No. 156,832, is hereby incorporated by reference.

BACKGROUND OF THE INVENTION

1. Field of the Invention

The present invention relates to timing systems and controlled lighting systems, and particularly to a timer that supervises the automatic control of lighting by a photo-electric controller.

2. State of the Art

There are numerous applications today in which automatic control of lighting in a home is useful and desirable. For example, a common use of such control is to create the appearance that the house is occupied when in fact the residents are away on vacation. In a number of these applications, an electromechanical device or an electronic device is used to provide a switching action that connects a lamp to the a-c supply at one time and disconnects the lamp from the a-c supply at another time. In some such systems the switching action is initiated by a timer, and in other such actions the switching action is initiated by a light sensor.

The timed switching systems known to be available for the control of home lighting are designed to enable the user to "program" the times at which the lamp is switched on and off. In some devices, an analog input is provided for, with an analog display of the programmed time. In other devices, a digital keypad is provided for the entry of programmed times, and a digital display is provided. A common problem encountered in the use of all such devices is the complexity of the programming procedure. For many people, the programming procedure is too difficult to learn. For others, the procedure is too difficult to remember from one use of the device to another. Even those who can learn and remember how to use such a timing device often find it inconvenient to use because of the time required for the programming operation and the inconvenience of having to program the device several times during the year to match the changing times of dusk during the year. A common experience is for the resident of the house to think of the timer as he is preparing to leave the house, in a rush to depart on his vacation and already burdened with other last-minute concerns. Moreover, such systems do not provide automatic lighting on unusually cloudy days, for example, during daytime intervals when lighting is normally not required. Such failure to provide lighting when an occupied home might reasonably be expected to be lighted is a very undesirable feature of timed lighting control systems.

This difficulty can be overcome by the use of a photoelectric controller that automatically turns a lamp or other electric appliance on when the ambient light level has remained below a predetermined level for a predetermined length of time and automatically turns that lamp or other electric appliance off when the ambient light level has remained above a predetermined level for a predetermined length of time. A serious failing of available systems of this kind is that the lamp will remain turned on throughout the night. An improved version of such a system is now avaiable, in which an interval timer is provided to turn the lamp off after a predetermined length of time following the turning on of the lamp. It is ordinarily assumed that the lamp will be turned on at about dusk, and the interval timer is adjusted to turn off the lamp approximately five hours later, at a time at which the residents of the home might reasonably be expected to retire for the night. The presence of clouds or other obstructions of the sun during the daytime can cause the lamp to be switched on during the day, however. The use of an interval timer to turn the lamp off after a predetermined length of time can then result in the absence of lighting during hours of the day in which the residents of the home might reasonably be expected to be up and about and in need of artificial light if they were indeed at home. Such an occurrence represents a failure of the system, in that the home is not automatically lighted during normal waking hours as desired.

A second shortcoming of a photoelectric controller with an interval timer is that if an occupant of the home arises during the night after the timed interval has elapsed and turns on a light, that light may be sensed by the photoelectric timer as if it were daylight at the beginning of the next day. When the artificial light is turned off, the photoelectric controller then interprets the loss of light as an indication of nightfall and turns on the controlled lamp. In this way, a photoelectric controller can improperly cause a controlled lamp to be turned on during the night even though an interval timer is used.

The purpose of the present invention is to overcome the shortcomings of both the currently available timed switching systems and the currently available photoelectric controllers.

SUMMARY OF THE INVENTION

In accordance with the present invention, an electronic clock is used to provide the time of day on a continuing basis. A battery is provided to ensure that correct time is maintained by the clock even in the event of an alternating-current power failure and in spite of removal of the electronic clock from all sources of alternating-current power. The device is programmed by the manufacturer to allow the switching on and off of a lamp or other electric appliance by a photoelectric control during normal waking hours (say, from about six a.m. until about eleven p.m.) and to ensure that the lamp is turned off throughout the night (say, from about eleven p.m. until about six a.m.). Thus, the user is spared the problems of programming the device himself as well as having to change the program several times during the year to account for changes in the time of dusk. In addition, lighting control is provided on a completely natural basis, as it would be if the home were, indeed, occupied. The device is completely automatic; it need only be plugged into a normal alternating-current outlet, and the lamp or other appliance to be controlled is then simply plugged into a receptacle on the device. Because the lamp or other appliance to be controlled cannot be turned on by the device during normal sleeping hours (for example, from eleven p.m. to six a.m.), and because during the remainder of the day the lamp or other electric appliance to be controlled is turned on and off in the same way as it would be if the home were occupied by a human being, there can be no turing on of the lamp or other electric appliance when the ambient light level is too high for a human occupant to require artificial lighting, as happens with ordinary timers now available, and there can be no turning on of the lamp or other electric appliance during normal sleeping hours, as happens with ordinary photoelectric lighting controls now available with or without an interval timer. Nor can there be a failure to turn on the lamp or other electric appliance during daytime hours on an unusually dark day, as happens with ordinary timers now available and with the photoelectric lighting controls equipped with interval timers.

BRIEF DESCRIPTION OF THE DRAWINGS

The above and other advantages and features of the invention will be apparent to those skilled in the art from the following description of the system taken in conjunction with the accompanying drawings, in which:

FIG. 3 is a diagram of a modification of the system shown in FIG. 1 for use as a replacement for a normal electric wall switch that controls an electric lamp or other electric appliance.

GENERAL DESCRIPTION OF THE SYSTEM

Figure 1:
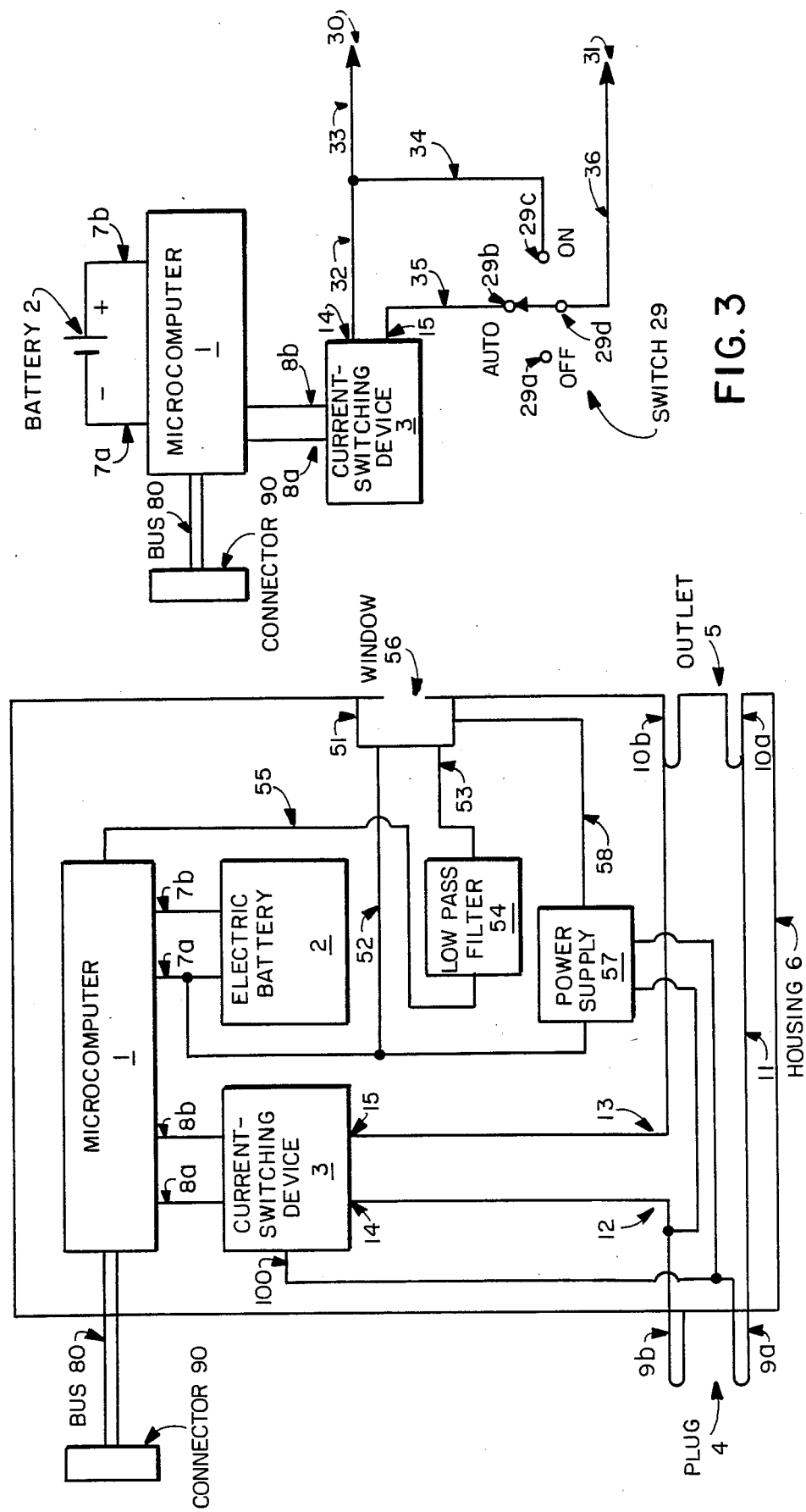
FIG. 1 is a block diagram of the novel security lighting system.

With reference to FIG. 1, one embodiment of the novel system that achieves completely automatic control of the lamp or other electric appliance is shown in block schematic form. As is there shown, a microcomputer 1 is provided, which may comprise a microprocessor, memory, and an input-output port. An electric battery 2 is included, to provide electric power for the operation of the microcomputer 1 and a current-switching device 3, which is also provided. A photodetector circuit 51 is mounted just within a window 56 in the housing 6, so that ambient light can be detected. The photodetector circuit 51 is supplied with a positive voltage provided by a power supply 57 on one conductor 58 and is connected to the reference potential, or ground, by means of a second conductor 52. The electric signal provided by the photodetector circuit 51 indicative of the level of the ambient light is connected to the input terminal of a lowpass filter 54 by means of another conductor 53, and the output of the lowpass filter 54 is connected to the microcomputer 1 by means of still another conductor 55. Also included are an electric plug 4 and an electric outlet 5.

The battery 2 is connected to the microcomputer 1 by a ground conductor 7a and a second conductor 7b, and the current-switching device 3 is connected to the microcomputer 1 by a ground conductor 8b and a second conductor 8a. One blade 9a of the plug 4 is connected to one blade 10a of the outlet 5 by a conductor 11. The second blade 9b of the plug 4 is connected to one terminal 14 of the current-switching device 3 by a conductor 12, and the second blade 10b of the outlet 5 is connected to another terminal 15 of the current-switching device 3 by a conductor 13. In some embodiments of the system, an additional ground conductor 100 may be provided, so that at least most of the current required to activate the current-switching device 3 can be obtained from the alternating-current supply instead of from the battery 2.

The microcomputer bus 80 is made available at a connector 90, so that the clock can be set prior to the time of delivery of the device to the customer, by means of circuitry not shown in FIG. 1 and not a part of this invention. Procedures for setting the clock are well known to those skilled in the art, and may be the same as the procedure used in setting the time of the clock in a video cassette recorder, for example.

Under control of a program stored in its memory, the microcomputer 1 maintains the correct time of day. At a predetermined time of day (about six a.m., for example), the microcomputer 1 begins to sample the output of the lowpass filter 54 to determine whether the ambient light level is low enough to require artificial lighting in the home. If so, the microcomputer 1 issues a signal on its output conductor 8a to turn on the current-switching device 3. In response to that signal, the current-switching device 3 causes its normally open terminals 14 and 15 to become connected together (or "closed"), thus completing the circuit between the plug 4 and the outlet 5 via the conductors 12 and 13 that connect the plug 4 and the outlet 5, respectively, to the current-switching device 3. In this way, electric power from the normal electric outlet into which the plug 4 may be plugged is made available to the outlet 5 contained in the security lighting system.

The connection of the plug 4 to the outlet 5 through the current-switching device 3 is maintained by the signal provided by the microcomputer 1 on the conductor 8a that connects the current-switching device 3 to the microcomputer 1 until a later time at which, in the course of continued sampling of the output of the lowpass filter 54, the microcomputer 1 finds that the ambient light level is sufficient that artificial lighting is not required. At that time, under control of the program stored in its memory, the microcomputer 1 removes the signal sent to the current-switching device 3 on its output conductor 8a that links the current-switching device 3 to the microcomputer 1. In response to this action, the terminals 14 and 15 of the current-switching device 3 return to their normally open condition, thus disconnecting the outlet 5 from the plug 4. Consequently, power from the normal electric outlet into which the plug 4 may be plugged is no longer available at the outlet 5 contained within the security lighting system.

If when the output of the lowpass filter 54 is first sampled on a given day by the microcomputer 1 the ambient light level is already sufficient that artificial lighting is not required, no signal is sent by the microcomputer 1 to the current-switching device 3 to connect the outlet 5 to the plug 4.

Sampling of the output of the lowpass filter 54 by the microcomputer 1 continues throughout the day until a second predetermined time (about eleven p.m., for example). At that time, under control of the program stored in its memory, the microcomputer 1 ensures that no signal is present on its output conductor 8a to connect the outlet 5 to the plug 4, and the microcomputer 1 ceases sampling the output of the lowpass filter 54 until the first predetermined time on the following day. Throughout the day, from the first predetermined time until the second predetermined time, when the sampled output of the lowpass filter 54 indicates an insufficient level of ambient light, the microcomputer 1 causes the plug 5 to be connected to the plug 4; and when the sampled output of the lowpass filter 54 indicates a sufficient level of ambient light, the microcomputer 1 causes the plug 5 to be disconnected from the plug 4.

DETAILED DESCRIPTION

Figure 2:
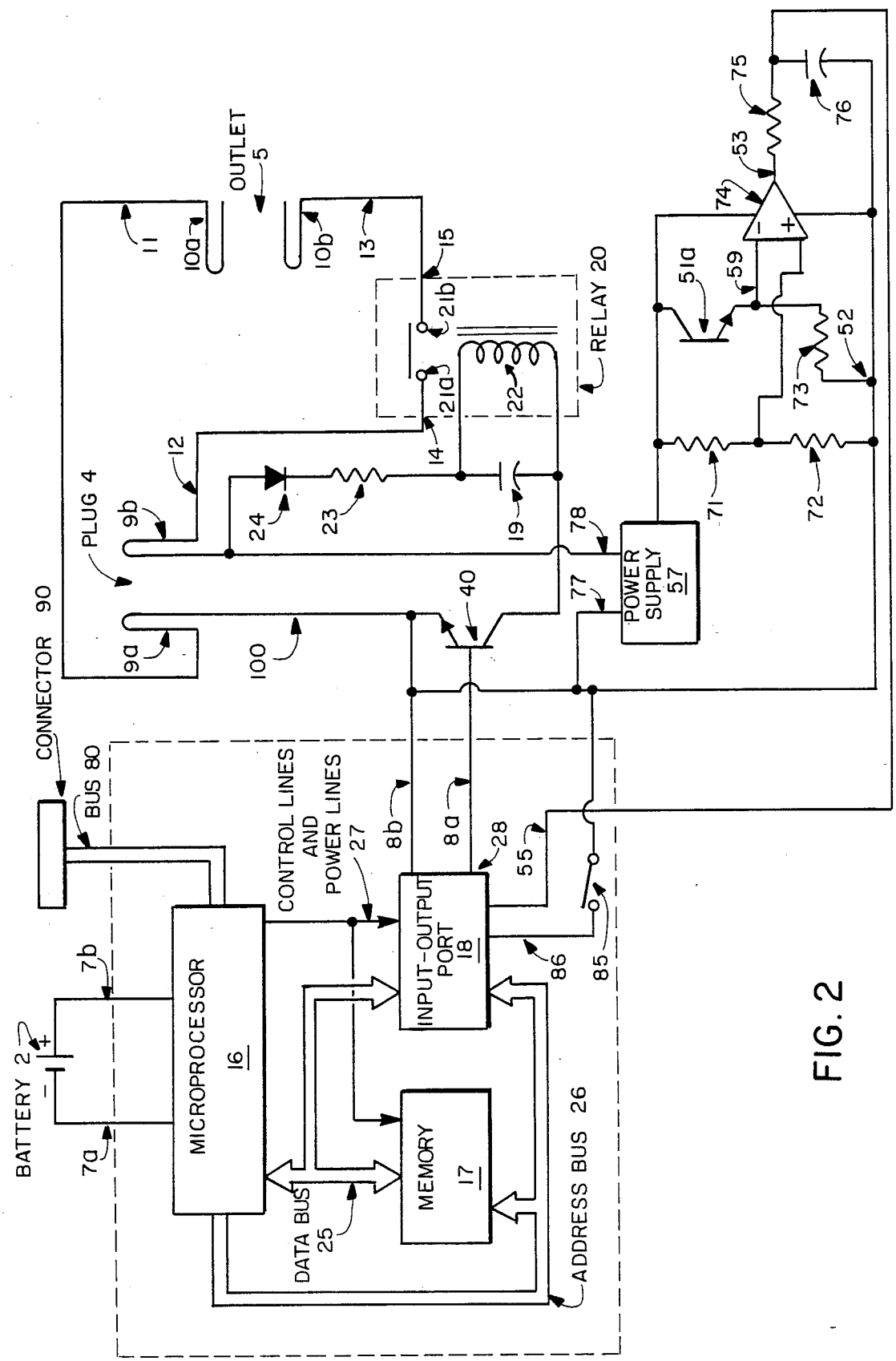
FIG. 2 is a more detailed diagram of the system shown in FIG. 1.

With reference to FIG. 2, one embodiment of the invention is shown in greater detail. The microcomputer 1 consists of a microprocessor 16, a memory 17, and an input-output port 18, all interconnected by a data bus 25, an address bus 26, and control and power lines 27. The current-switching device 3 consists, in this embodiment, of an electromechanical relay 20, a capacitor 19, a resistor 23, and a diode 24. The battery 2 serves to maintain the required operating voltage on the microprocessor 16, the memory 17, and the input-output port 18, so that the real-time clock implemented in the microcomputer 1 is constantly in operation and the correct time is always available in the microcomputer 1.

One of the power lines in the group of control lines and power lines 27 is connected through the microprocessor 16 to the negative terminal of the battery 2 and through the input-output port 18 via a conductor 8b to one blade 9a of the plug 4, to serve as the system ground.

The a-c voltage available on the plug 4 when it is connected to a wall outlet is supplied to a power supply 57, which converts said a-c voltage to d-c voltage of appropriate magnitude to operate other circuitry to be described, by means of two conductors 77 and 78. The positive output voltage of the power supply is connected to a resistor 71 and to a phototransistor 51a and a comparator 74. The details of the power supply, the phototransistor, and the comparator are well known to one skilled in the art and need not be presented here. The comparator is connected also to ground, in the customary manner. Said resistor 71 is connected in series with a second resistor 72 between the positive terminal of the power supply and ground, forming a voltage divider. The voltage at the junction of these two resistors 71 and 72 is connected to the non-inverting input terminal of the comparator 74 as a reference voltage. The phototransistor 51a is connected in series with a resistor 73 between the positive terminal of the power supply and ground, forming a second voltage divider. The voltage at the junction of the phototransistor 51a and the resistor 73 is connected by means of a conductor 59 to the inverting input of the comparator 74. Accordingly, as the level of the light incident on the phototransistor 51a increases, the voltage applied to the inverting input of the comparator 74 on the conductor 59 increases. At low light levels, as a result, the output voltage of the comparator 74 will be high; and at high light levels, the output of the comparator 74 will be low.

The output of the comparator 74 is applied on a conductor 53 to the input terminals of a lowpass filter comprising a resistor 75 and a capacitor 76. The output of said lowpass filter defining a light signal is connected by means of a conductor 55 to the input-output port 18 in such a way that said output voltage of said lowpass filter can be read by the microprocessor 16 under control of a program stored in the memory 17. The effect of said lowpass filter is to delay changes in the output voltage of the phototransistor 51a that appear on the conductor 59 that connects to the inverting input of the comparator 74 as said changes propagate to the input-output port 18. Thus, brief changes in light level are filtered out and do not cause switching of the lamp or other electric appliance plugged into the outlet 5, although long-lasting changes in light level do cause switching of said lamp or other electric appliance.

As a result of the inversion introduced by the comparator 74, a sustained high level of light incident on the phototransistor 51a causes the voltage on the conductor 55 connecting said lowpass filter to the input-output port 18 to go low, and a sustained low level of light incident on the phototransistor 51a causes the voltage on the conductor 55 connecting said lowpass filter to the input-output port 18 to go high. Consequently, the microprocessor is programmed to activate the current-switching device 3 when the light signal having a high voltage is read from said conductor 55 via the input-output port and to deactivate the current-switching device 3 when the light signal having a low voltage is read from said conductor 55 via the input-output port 18.

In addition, the microcomputer 1 commences to read the voltage on said conductor 55 at a predetermined time (for example, six a.m.) each day and to deactivate the current-switching device 3 and cease reading the voltage on said conductor 55 at a second predetermined time (for example, eleven p.m.) each day, under control of a program stored in said microcomputer.

The operation of the current-switching device 3 can be described as follows. When said current-switching device 3 is to be activated, due to the occurrence of a light signal having the high voltage during that portion of the day in which the microcomputer 1 reads the voltage on the conductor 55 that connects the lowpass filter 54 to the input-output port 18, the microprocessor 16 causes a logic signal to be latched in the input-output port 18 on a conductor 8a with respect to a ground conductor 8b, with the result that the transistor 40 is switched from cutoff into saturation. If alternating-current power is available at the plug 4, then on the positive half of each alternating-current cycle, an electric current will exist in the circuit extending from one blade 9b of the plug 4 through the diode 24 and the current-limiting resistor 23 and the coil 22 of the relay 20 and then through the saturated transistor 40 and finally through a conductor 100, to the second blade 9a on the plug 4. Consequently the relay 20 will be energized, with the result that the contacts 21a and 21b will be connected together, and thus blade 10b of the outlet 5 will be connected to blade 9b of the plug 4. Since blade 10a of the outlet 5 is permanently connected to blade 9a of the plug 4 by a conductor 11, power provided by the outlet into which the plug 4 is connected will then be made available at the outlet 5 in the security lighting system. The purpose of the capacitor 19 is to filter the alternating current and maintain a more nearly constant voltage on the coil 22 of the electromechanical relay 20, so that the relay 20 will remain energized throughout the negative half of each alternating current cycle, during which there is no current in the rectifier diode 24.

When said current-switching device 3 is to be deactivated, due to the light signal having the low voltage or due to the occurrence of the time at which the microcomputer 1 stops reading the light signal applied to the input-output port 18 for the day, the signal that was previously latched in the input-output port 18 on one conductor 8a with respect to the ground conductor 8b to activate said current-switching device 3 is cleared by the microcomputer 1, under program control. The transistor 40 is switched from saturation into cutoff as a result. Consequently, sufficient current to energize the relay 20 can no longer exist in the circuit consisting of the rectifier diode 24, the resistor 23, the coil 22 of the relay 20, the transistor 40, and the conductor 100 that connects the input-output port 18 to the plug 4. As a result, the contacts 21a and 21b in the relay 20 are again opened, and thus power is removed from the outlet 5.

The microcomputer bus 80 connected to the connector 90 for the purpose of providing means for setting the clock prior to delivery of the security lighting system to the customer comprises the address bus 26, the data bus 25, and the control lines and power lines 27 but is shown distinct from them in FIG. 2 for clarity.

It will be apparent to one skilled in the art that, although an electromechanical relay is shown in FIG. 2, the switching action desired can be effected by means of a triac or other solid-state electronic device instead.

It will be apparent also to one skilled in the art that an improvement of value particularly in security applications can be made by employing a microcomputer 1 programmed so that the time of day at which said microcomputer 1 ensures that the current-switching device 3 is deactivated and ceases to monitor the output of the lowpass filter 54 is the sum of two components: one component as described in the discussion of FIG. 2, and a second component that varies significantly from day to day. Similarly, an improvement may be achieved by programming the microcomputer 1 so that the time of day at which said microcomputer 1 begins to monitor the output of the lowpass filter 54 varies significantly from day to day.

A modification of the system shown in FIG. 1 that will be seen by one skilled in the art to fall within the scope of this invention is the placing of the plug 4 at the end of an electric cord that is connected as an extension of conductors 11 and 13, instead of in the housing 6 as shown in FIG. 1.

A second modification of the system shown in FIG. 1 that will be seen by one skilled in the art to fall within the scope of this invention is the mounting of the system directly on a modified two-wire electric cord terminated at one end in an electric plug and at the other end in an electric outlet, which consists of one conductor that is continuous through the security lighting system and a second, broken, conductor, one end of which connects inside the security lighting system to one terminal 14 of the current-switching device 3 and the other end of which connects inside the security lighting system to a second terminal 15 of the current-switching device 3.

Still another modification of the system shown in FIG. 1 is shown in FIG. 3. The microcomputer 1, the electric battery 2, and the current-switching device 3 are connected as in FIG. 1 and FIG. 2. One output terminal 14 of the current-switching device 3 is connected by a conductor 32 and a second conductor 33 at one point 30 to the conductor or conductors that normally connect to one terminal of a normal wall-mounted electric switch or a normal lamp-mounted switch or a normal appliance-mounted switch. The same output terminal 14 of the current-switching device 3 is connected by said conductor 32 and another conductor 34 to one fixed contact 29c on a three-position electric switch 29. The second output terminal 15 of the current-switching device 3 is connected by a conductor 35 to a second fixed contact 29b of the three-position electric switch 29. A movable contact 29d on the three-position electric switch 29 is connected by a conductor 36 at a second point 31 to the conductor or conductors that normally connect to the second terminal of the normal wall-mounted switch or the normal lamp-mounted switch or the normal appliance-mounted switch. A fourth terminal 29a on the three-position electric switch 29 is left unconnected. When the movable contact 29d is in contact with the first fixed contact 29c, the external circuit is completed regardless of the state of the current-switching device 3; this is the "manual ON" position of the electric switch 29. When the movable contact 29d is in contact with the second fixed contact 29b, the external circuit is automatically switched on and off by the current switching device 3, as described in the discussion of FIG. 1 and FIG. 2; this is the "automatic" position of the electric switch 29. When the movable contact 29d is in contact with the third fixed contact 29a, the external circuit is disconnected, regardless of the state of the current-switching device 3; this is the "manual OFF" position of the electric switch 29.

Yet another improvement in the security lighting system is the provision of a momentary-contact switch 85, shown in FIG. 2, by means of which an additional input connection 86 on the input-output port 18 may be supplied with a voltage that will be low in one position of said switch and high in a second position of said switch. The microcomputer 1 is programmed for this improvement to scan said additional input connection 86 on the input-output port 18 regularly and to set the clock to a predetermined time (for example, six thirty p.m.) when said momentary-contact switch 85 is found to be activated. Thus, it is possible for the user of the security lighting system to replace the battery 2 when necessary and reset the clock at any time within, say, one-half hour of the predetermined time (that is, at any time between six p.m. and seven p.m., for example). The system will then continue to function as before, with at most a change of, say, one-half hour in the predetermined time at which the system begins to sample the light level each day and the predetermined time at which the system ceases to sample the light level each day.

A connector 90 and the computer bus 80 are provided for use in setting the time of the clock prior to the time of delivery of the security lighting system to the customer, as mentioned in the discussion of FIG. 1 and FIG. 2.

It is now evident that the essence of this invention is the use of a real-time clock in a control system to supervise the operation of a photoelectric lighting controller. The result is a security lighting system without the shortcomings of currently available timed switching systems and without the shortcomings of currently available photoelectric controllers, with or without an interval timer. While only particular embodiments of the invention have been described and illustrated, it is apparent that modifications may be made therein. It is the object of the invention in the appended claims to cover all such modifications as may fall within the true scope and spirit of the invention.

What is claimed is:

1. An electrical outlet adapter, designed to be installed with ease by merely plugging it into a standard electrical outlet without the need to program said adapter, for automatically switching a second electrical outlet on and off in response to the level of ambient light between a first time of day and a second time of day, said first time of day and said second time of day being independent of the level of ambient light and being built into said adapter with no provision for altering them during the lifetime of said adapter, said electrical outlet adapter comprising:

an electrical plug compatible with a standard electrical outlet;

an electrical outlet;

a clock that is set and started during the manufacturing process, for generating the time of day, with no provision for altering the time of day generated by said clock during the lifetime of said adapter;

a source of energy connected to said clock to ensure that the time of day is maintained by said clock;

photodetector circuit means for sensing the level of ambient light and for generating a light signal which has a first logic value when the level of ambient light is below a reference level and which has a second logic value when the level of ambient light is above the reference level;

storage means in which said first time of day and said second time of day are stored during the manufacturing process;

means for comparing the time of day generated by said clock with said first time of day and said second time of day, and for providing an output signal that is equal to said light signal when the time of day generated by said clock is between said first time of day and said second time of day and that is equal to a selected one of said first logic value and said second logic value when the time of day generated by said clock is outside the range extending from said first time of day to said second time of day;

switching means responsive to said output signal for connecting said electrical plug to said electrical outlet and disconnecting said electrical outlet from said electrical plug; and a compact integral housing, with no provision for programming said clock and no provision for displaying time.

2. An electrical outlet adapter as claimed in claim 1, wherein said first time of day varies significantly from day to day in accordance with a program stored in said storage means at the time of manufacture of said electrical outlet adapter.

3. An electrical outlet adapter as claimed in claim 1, wherein said second time of day varies significantly from day to day in accordance with a program stored in said storage means at the time of manufacture of said electrical outlet adapter.

4. An electrical outlet adapter as claimed in claim 1, further comprising means for varying the time of the clock relative to true time, with no means for displaying the time of the clock.

5. An electrical outlet adapter as claimed in claim 1, further comprising a manually operated switch for selectively connecting said electrical plug to said electrical outlet, disconnecting said electrical outlet from said electrical plug, and allowing manual connection of said electrical outlet to said electrical plug and disconnection of said electrical outlet from said electrical plug by means of said manually operated switch.

6. A system for automatically connecting a source of electric power to an electrical outlet connectable to an electrical appliance and disconnecting said electrical outlet from said source of electric power, comprising:

photodetector means for sensing the level of ambient light and for generating a light signal indicative thereof;

microcomputer means controlled by a stored program for sampling said light signal from said photodetector means between a first predetermined time of day and a second predetermined time of day, said first predetermined time of day and said second predetermined time of day being independent of the level of ambient light and being stored in said stored program at the time of manufacture of said system, and providing an output signal that, between said first predetermined time of day and said second predetermined time of day, has a first logic value when the most recent sample of said light signal is less than a threshold level and a second logic value when the most recent sample of said light signal is larger than said threshold level and that has said first logic value at all other times of day, with no provision for changing said first predetermined time of day nor said second predetermined time of day during the lifetime of said system and no provision for displaying said first predetermined time of day nor said second predetermined time of day; and switching means responsive to said output signal for connecting said electrical outlet to said source of electric power and disconnecting said electrical outlet from said source of electric power.

7. A system as claimed in claim 6, wherein said first predetermined time of day is made to vary significantly from day to day in accordance with a program stored in said storage means at the time of manufacture of said system.

8. A system as claimed in claim 6, wherein said second predetermined time of day is made to vary significantly from day to day in accordance with a program stored in said storage means at the time of manufacture of said system.

9. A system as claimed in claim 6, further comprising a manually operated switch for selectively connecting said electrical outlet to said source of electric power, disconnecting said electrical outlet from said source of electric power, and allowing manual connection of said electrical outlet to said source of electric power and disconnection of said electrical outlet from said source of electric power by means of said manually operated switch.

* * * * *